P. JARVIS.
Wagon-Brake.
No. 225,139. Patented Mar. 2, 1880.
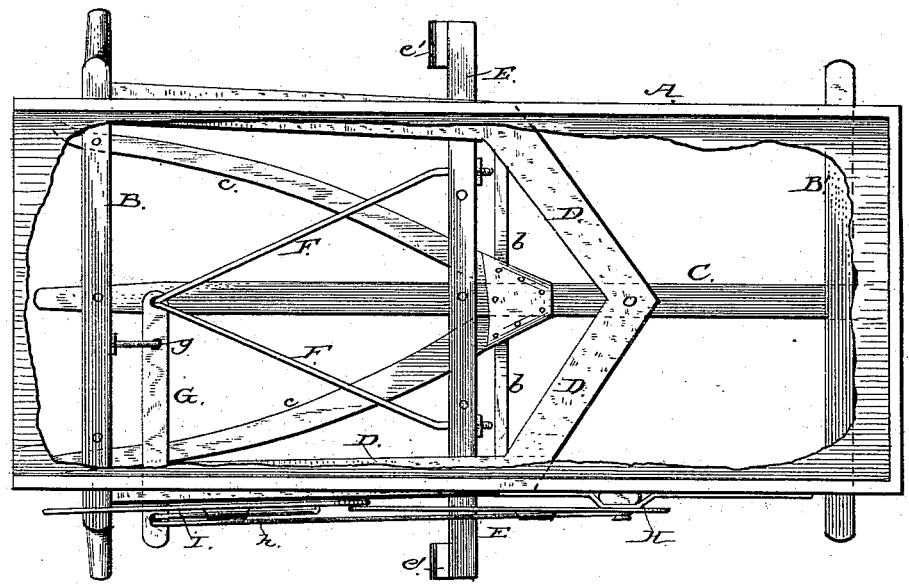
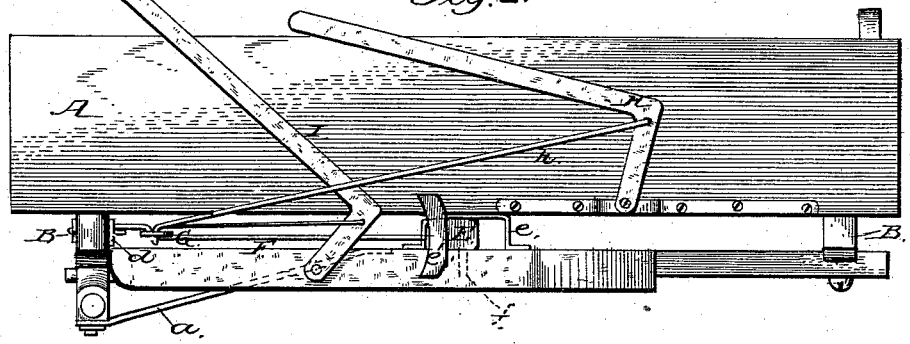
Witnesses;
T. Walter Fowler
R. K. Evans
Inventor.
Philip Jarvis
by his attys
A. H. Evans & Co.

UNITED STATES PATENT OFFICE.

PHILIP JARVIS, OF MOUNT AYR, IOWA.

WAGON-BRAKE.

SPECIFICATION forming part of Letters Patent No. 225,139, dated March 2, 1880.

Application filed August 19, 1879.

*To all whom it may concern:*

Be it known that I, PHILIP JARVIS, of Mount Ayr, county of Ringgold, State of Iowa, have invented certain new and useful Improvements in Wagon-Brakes; and I do hereby declare the following to be a full, clear, and exact description thereof, reference being had to the accompanying drawings, making a part of this specification, and in which—

Figure 1 is a plan view of the brake-gear, shown through the bottom of the wagon-body, which is broken away for that purpose. Fig. 2 is a side elevation of wagon reach and body with my brake attached.

My invention relates to certain new and useful improvements in the class of wagon-brakes attached to the running-gear instead of to the bed of a wagon; and the invention has for its object the production of a wagon-brake which shall be simple in construction, easily operated, and not liable to get out of order; and to this end the invention consists in the general construction, combination, and arrangement of parts, as will be hereinafter described and claimed.

To enable others skilled in the art to make and use my invention, I will proceed to describe the exact manner in which I have carried it out.

In the drawings, A represents the wagon box or bed; B B', the bolsters of the running-gear, connected together by the perch C and braced by the hounds *c c* in the usual manner. D represents a bent metallic frame, the side bars, *d d*, of which are bolted at their rear ends to the bolster B, said bars extending forward beyond the center of wagon-bed, and then bent inward toward each other and bolted to the perch C.

The metallic frame is securely braced longitudinally by the parallel brace-bars *a a*, bolted to the under side of the axle-tree and the frame, and the transverse brace-bars *b b*, bolted to the frame, and the diagonal bars *c c*.

The side bars of the metallic frame are provided with hasps *e e*, through which passes the transverse brake-bar E, having secured upon its ends the rubbers *e' e'*.

The hasps *e e* are of sufficient length to give the necessary longitudinal play to the brake-bar, while the studs *f f* on the under side of the brake-bar prevent it from having any lateral play.

F F represent two diagonal rods connecting the brake-bar with one end of a transverse lever, G, having its fulcrum on a hooked bolt, *g*, secured to the bolster B. This lever G extends just outside of the wagon bed or body, and is connected, by means of the hooked rod *h*, to the right-angled or bell-crank lever H near the angle thereof, the end of the short arm of said lever H being fulcrumed to the side of the wagon bed or body A.

I represents a similarly-shaped auxiliary lever fulcrumed to one of the sides of the metallic frame. At the bend in the lever it is furnished with a link, *l*, which is to engage in the end of the brake-lever G when the link *h* of the lever H is disengaged therefrom. The purpose of this auxiliary lever is to enable the brake to be operated when it is necessary to remove the bed from the wagon, as in carrying lumber.

Having thus described my invention, what I claim as new, and desire to secure by Letters Patent, is—

The frame D *b a*, attached to the reach and rear bolster of the wagon, as shown, in combination with lever H, link *h*, lever G, fulcrum *g*, rods F F, and brake-bar E, all constructed, arranged, and operated as set forth.

PHILIP JARVIS.

Attest:
E. C. MCMASTER,
THOS. LIGGETT.